Sept. 4, 1951 K. C. CRUMRINE 2,567,057
CHEMICAL ANALYSIS USING NEUTRONS
Filed Aug. 2, 1948 2 Sheets-Sheet 1

NEUTRON AND NUCLEUS
BEFORE AND AFTER
COLLISION IN C.G. SYSTEM

SCATTERED VELOCITY
AS VECTOR SUM

INVENTOR.
KENNETH C. CRUMRINE
BY Daniel Stryker
ATTORNEY

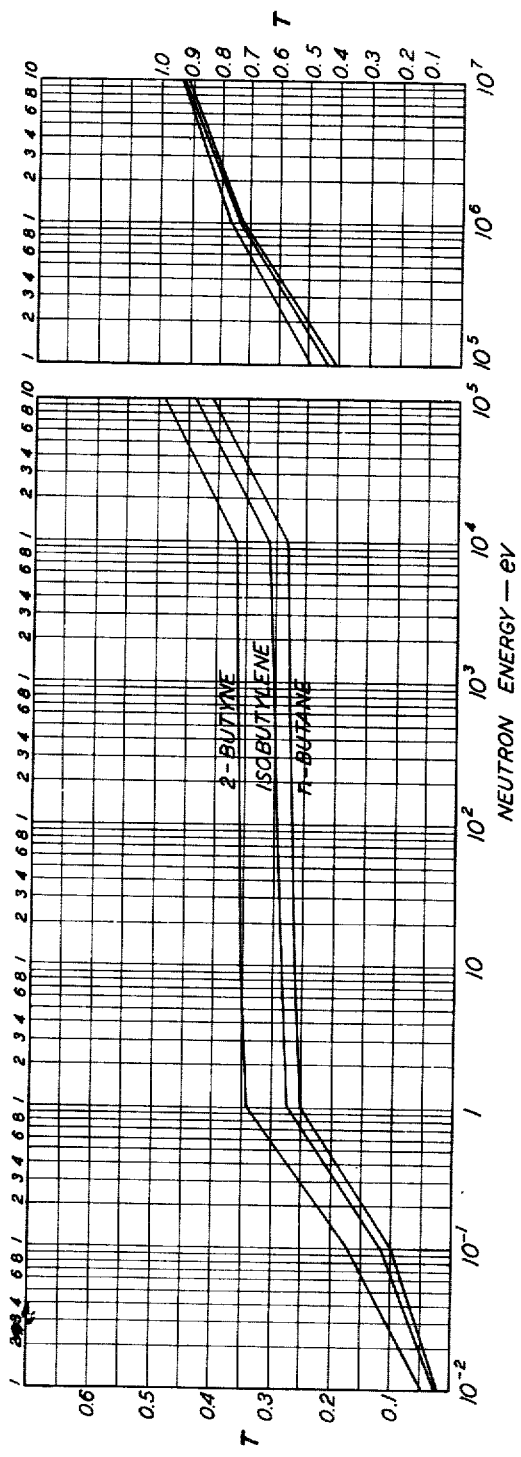
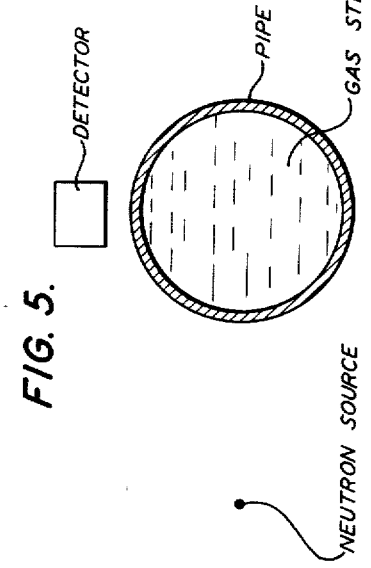

Patented Sept. 4, 1951

2,567,057

UNITED STATES PATENT OFFICE 2,567,057

CHEMICAL ANALYSIS USING NEUTRONS

Kenneth C. Crumrine, Tulsa, Okla., assignor to The Texas Company, New York, N. Y., a corporation of Delaware Application August 2, 1948, Serial No. 41,962

2 Claims. (Cl. 250—83.6)

This invention relates to chemical analysis and particularly to the analysis of mixtures of carbon-hydrogen compounds and other compounds containing hydrogen or other elements of large interaction cross-sections for neutrons. The invention is particularly applicable in oil refineries, where it affords a simple and reliable means for detecting changes in the composition of a hydrocarbon mixture in a pipe or a vessel, say a still.

Neutrons are produced in several ways. A convenient way is to bombard beryllium with alpha particles, the neutrons being formed as the result of the reaction

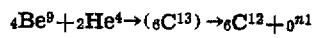

where $_0n^1$ represents the neutron and indicates that it has zero charge and unity mass number. The alpha particles may come from various sources, for example radium or radon, and a conventional source of fast neutrons consists of a mixture of radium and beryllium.

In accordance with the instant invention a material to be analyzed is subjected to neutron bombardment, and the analysis of the material is determined by detecting the neutrons transmitted through the material or back-scattered from it. Hydrogen and some other elements have relatively large cross-sections for interaction with neutrons. In consequence, the mean free paths of neutrons in carbon-hydrogen compounds vary, depending upon the ratio of carbon to hydrogen in the compounds. By way of example, the mean free paths of slow neutrons in $C_4H_2$, $C_4H_4$, $C_4H_6$, $C_4H_8$, and $C_4H_{10}$ are respectively about 1.6 cm., 0.81 cm., 0.60 cm., 0.48 cm., and 0.44 cm. The neutron mean free paths in members of the same family of carbon-hydrogen compounds show smaller differences. For example, in the $C_4H_6$ group, butadiene ($CH_2:CHCH:CH_2$) and 1-butyne ($CH:CCH_2CH_3$) have mean free paths in the inverse ratio of their densities, or say as .612 is to .596. Mixtures of compounds have mean free paths dependent upon the neutron mean free paths of the individual components. Thus a binary mixture of $C_4H_6$ and $C_4H_{10}$ will have a mean free path for neutrons intermediate 0.60 and 0.44 cm.

The transmission and scattering of neutrons depend upon the mean free path in the medium in which the transmission and scattering occurs. Scattering may be considered as transmission through at least a portion of the body. Hence the measure of transmission or scattering or both is a measure of mean free path and consequently an index of the composition of the medium. To take a simple case of the practice of the invention, a liquid mixture of $C_4H_6$ and $C_4H_{10}$ is passed as a stream through a steel pipe. A source of fast neutrons, say a mixture of radium and beryllium, is placed on one side of the pipe. Neutrons pass through the steel of the pipe and are slowed down chiefly by the hydrogen content of the mixture. Some of the neutrons are back-scattered toward the source; others are transmitted through the mixture. A neutron counter is disposed outside the pipe in the path of the back-scattered or of the transmitted neutrons, and the number of neutrons per unit time is detected. The number detected per unit time (intensity) for a given source, detector and geometry is a function of the neutron mean free path in the mixture and hence of its composition. By making a continuous record of detected neutron intensity, a continuous index of the proportions of $C_4H_6$ and $C_4H_{10}$ in the mixture passing through the pipe is obtained.

Neutron source, material to be analyzed, and detector should be disposed in a fixed geometric relationship, and a standard thickness of material should be employed. In practice, this latter requisite is met by keeping the material in a vessel of fixed dimensions such as a pipe or a tank.

As noted at the outset, there are numerous satisfactory artificial neutron sources for use in the invention. The bombardment of beryllium with alpha particles to produce neutrons is but one of a number of $\alpha$-$n$ reactions. Thus alpha bombardment of lithium, boron, sodium, magnesium, aluminum and phosphorus also results in neutron production. The bombardment of heavy hydrogen by deuterons also results in neutron emission.

The neutrons employed in the practice of the invention may be emitted in all directions or may be collimated in a beam employing a neutron "howitzer," for example that described by Powers, Carroll and Dunning, Phys. Rev., vol. 56, p. 266 (1938).

It is shown in the detailed discussion which follows that increased discrimination between compounds in the practice of the invention is obtained if the neutrons employed to bombard the mixture (in which the compounds occur) do not have excessive energy. By selecting a proper source and employing filters or screen to absorb those neutrons having an energy below a desired threshold value, say 1 ev., neutrons in any desired energy range or spectrum portion may be obtained. Thus a cadmium screen may be interposed between the neutron and the material undergoing analysis to absorb "thermal" neutrons, etc.

Various types of neutron detectors may be employed. One suitable form is a proportional counter lined with boron carbide and sensitive to slow neutrons. Fast neutrons from the source pass through the walls of the vessel, are slowed down by collision with hydrogen nuclei and are either scattered back or continue through the mixture at reduced energy. The neutrons that have their energy reduced, whether they be back-scattered or continue through the mixture, are susceptible of detection by the counter, while the fast neutrons are not detected.

The proportional counter lined with boron carbide is only one of a number of devices available for the detection of slow (low energy) neutrons. Gaseous boron trifluoride may be employed as filling to sensitize a proportional counter to slow neutrons, and either solid or gaseous lithium compounds may be employed to the same end. A counter lined with uranium and operating by fission may also be employed for the detection of slow neutrons.

Counters for fast neutrons are also available. Thus an ionization chamber filled with hydrogen at high pressure is effective in detection of fast neutrons. Proportional counters for slow neutrons may also be employed by protecting them with shields of hydrogen-containing substances which serve to slow neutrons to a detectable range.

It is within the contemplation of the invention to detect the intensity of either fast or slow neutrons emitted from the sample undergoing investigation and to measure the intensity of only those emitted neutrons in a given energy range.

The invention offers the advantages of rapid and continuous analysis, and is particularly useful as a method of control for refinery operations or the like. Generally speaking, its usefulness is less when the number of carbon-hydrogen compounds in a stream is large, or when the compounds do not have markedly different mean free paths, since in these cases the discriminatory power of the process of the invention is diminished. Nevertheless, there are a great many places in oil refineries and chemical plants where the invention is applicable not only to continuous quantitative analysis of mixture streams, but also to automatic process control through electrical or mechanical linkages which operate a control means, say a valve, in response to variations in detected neutron intensity.

The invention will be more thoroughly understood through reference to the following discussion which is illustrated by the accompanying drawings, in which:

Fig. 4 is a plot of the fractional transmission of neutrons at various energies through various hydrocarbons employing apparatus of the geometry of Fig. 1; and Fig. 5 is a diagram illustrating another geometrical arrangement for the practice of the invention.

Figure 1:
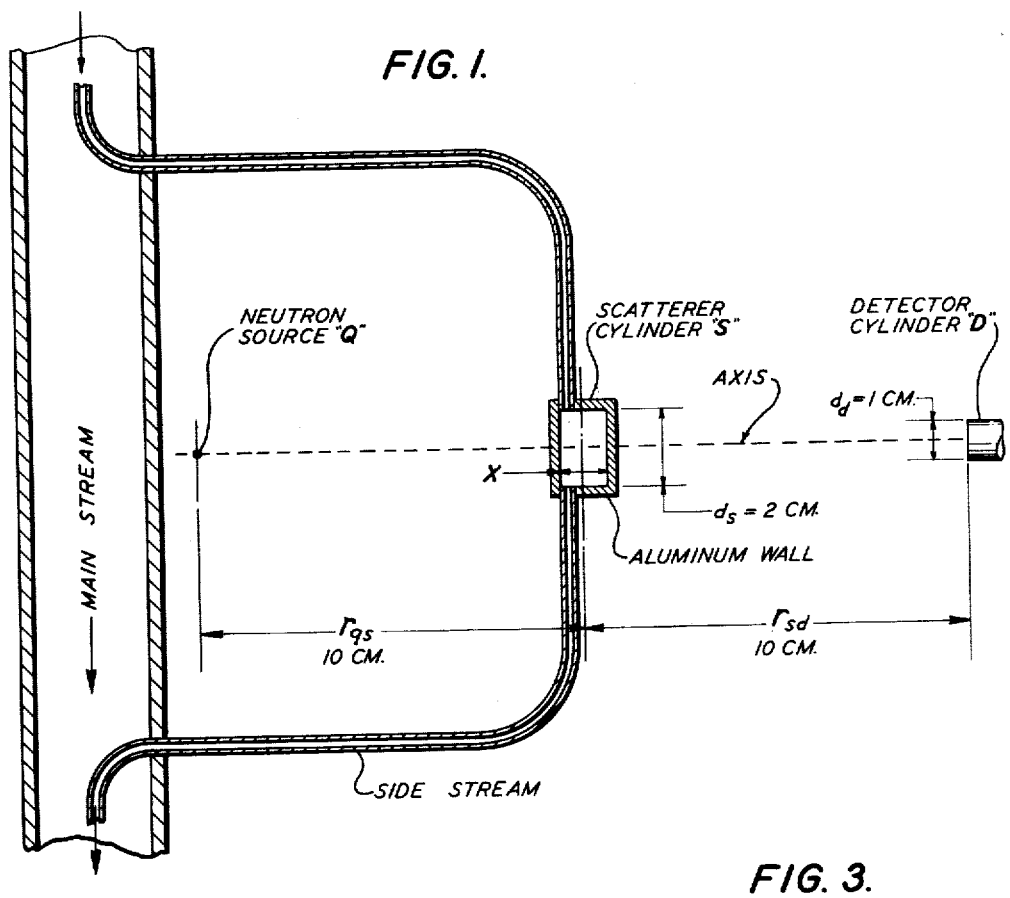
Fig. 1 is a diagram illustrating the geometry assumed in the derivation of a number of working equations set forth below.

Referring to Fig. 1, a main stream of a hydrocarbon mixture to be analyzed is shown as flowing in a pipe. A sample or side stream is tapped off the main stream and flown through a scatterer cylinder S having a diameter $d_s$ of 2 cm. and a thickness X, the cross-section area of the cylinder being $A_s = \pi$ cm.$^2$. A detector D for neutrons is disposed coaxially with the scatterer cylinder with its face a distance $\gamma_{sd} = 10$ cm. from the center line of the scatterer. The detector has a diameter $d_d = 1$ cm. so that its face area $A_d = \pi/4$ cm.$^2$. A point source Q of neutrons is disposed on the common axis of detector and scatterer at a distance of $\gamma_{qs} = 10$ cm. from the center line of the scatterer and opposite the detector. The scatterer has a wall of some material of low scattering cross section, such as magnesium or aluminum.

A set of working equations has been derived for the geometry of Fig. 1, as follows:

I. Transmission by Point Scatterer to Point Detector

When a neutron beam traverses an element of volume $\Delta X \Delta Y \Delta Z$ in the X direction, the number of neutrons in the beam is reduced by the action of scattering from the nuclei in the volume element:

$$\Delta N = -FN\Delta X$$

where F has the meaning "the fraction of neutrons scattered out per unit distance, and has dimensions, cm.$^{-1}$.

To express F in terms of measurable quantities, it appears from its definition above that $F =$ (nuclear area/total area) per unit distance $$= \frac{(n \text{ nuclei/cm.}^3) \times (\Delta X \Delta Y \Delta Z \text{ cm.}^3) \times S(\text{cm.}^2/\text{nucleus})}{(\Delta Y \Delta Z \text{ cm.}^2)} \times \frac{1}{\Delta X \text{ cm.}}$$

$= ns$ cm.$^{-1}$

If the above equation for the attenuation of the beam is expressed in differential form and integrated it yields $$N = N_o e^{-FX}$$

and the transmission $T^1 \equiv N/N_o = e^{-FX} = e^{-nsX}$

For a scatterer with nuclei of more than one type $ns$ the following summation must be used:

$$T^1 = e^{-i(n_i s_i) X} \quad (1)$$

where $T^1 =$ fraction of neutrons transmitted
$n_i =$ number nuclei of type $i$/cm.$^3$
$s_i =$ cm.$^2$ scattering area/nucleus of type $i$ (scattering cross section)
$X =$ cm. thickness of sample To deal with hydrocarbons only, the relevant special case of Equation 1 is $$T^1 = e^{-(n_H s_H + n_C s_C)Q} X \quad (1A)$$

II. Corrections for (A) Finite Scatterer and Detector; (B) Preferential Forward Scattering Equation 1 gives the fraction of neutrons transmitted along their original lines of flight. In any actual case, however, there will be factors which modify this equation by allowing neutrons to reach the detector by paths other than straight lines from the source.

(A) If Q, Fig. 1, emits N neutrons in all directions, the fraction $A_d/4\pi(\gamma_{qs} + \gamma_{sd})^2$ are in the cone directed toward D, and the number arriving at D by straight paths is $$T^1 N A_d / 4\pi(\gamma_{qs} + \gamma_{sd})^2$$

(Note.—The use of plane area, e. g. $A_d$, instead of curved area represents a good approximation for the case of small solid angles.)

Now the number that are single-scattered into D by the nuclei in S can be calculated thus:

$NA_s/4\pi\gamma qs^2$ arrive at S
$(1-T^1)NA_s/4\pi\gamma qs^2$ are scattered by S
$(1-T^1)N(A_s/4\pi\gamma qs^2)(A_d/4\pi\gamma sd^2)$ are scattered by S into D Therefore, calling T the corrected transmission, $TN^{Ad}/4\pi(\gamma qs+\gamma sd)^2 = T^1N^{Ad}/4\pi(\gamma qs+\gamma sd)^2 +$
$(1-T^1)N^{A+Ad}/(4\pi)^2\gamma qs^2\gamma sd^2\gamma sd^2$ and $T =$ $$T = T^1 + (1-T^1)\frac{A_s(\gamma qs+\gamma sd)^2}{4\pi\gamma qs^2\gamma sd^2} \quad (2)$$

which, for the special case $\gamma qs = \gamma sd = \gamma$, becomes $$T = T^1 + (1-T^1)A_s/\pi\gamma^2 \quad (2A)$$

(B) In paragraph (A) the number of neutrons scattered by S is multiplied by the fraction $$A_d/4\pi\gamma sd^2$$

to obtain the number scattered into D. This correction is right provided neutrons are scattered with equal probability in all directions. To keep the analysis simple, such isotropic scattering by the nucleus is assumed, and yet it is isotropic only in the coordinate system of the center of gravity. For a very heavy nucleus the C. G. system would practically coincide with the laboratory system and isotropic scattering could be assumed in both systems. For hydrogen the neutron and nuclear masses are equal, and the C. G. system is moving with half the speed of the incident neutron. In this case the scattering, which is isotropic in the C. G. system, is bunched forward in the laboratory system.

This latter effect occurs only when the struck nucleus is free to recoil. In the hydrocarbons binding energies are of the order of an electron volt. Therefore the effect discussed above is considered as real for neutrons above 1 ev., where the nucleus will be rendered free to recoil, and as not real for neutrons below 1 ev., when the struck nucleus stays bound to the molecule and acts as though it had the mass of the whole molecule (effectively infinite).

Figure 2:
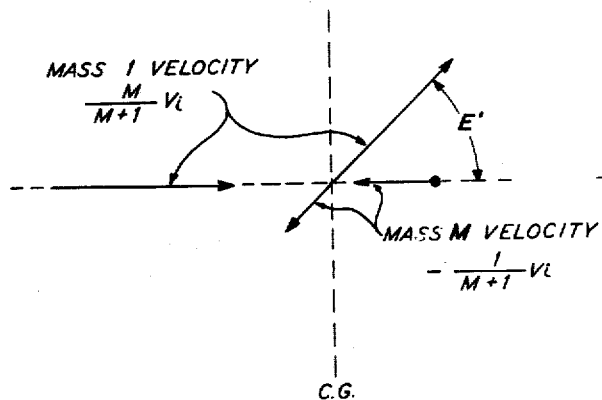
Fig. 2 is a diagram illustrating neutron and nucleus before and after collision in a C. G. system.

If E is the angle which upon rotation generates the cone with altitude $\gamma sd$ and base area $A_d$, then the solid angle of the cone is $(1-\cos E)/2$. Now the effect of preferential forward scattering is to drive more neutrons into D than correspond to the angle E and the solid angle $(1-\cos E)/2$; the correct number of neutrons will correspond to some larger angle $E^1$ and solid angle $(1-\cos E^1)/2$. The correction factor that is to be multiplied by $A_d/4\pi\gamma sd^2$ then will be $(1-\cos E^1)/(1-\cos E)$. To obtain the relation between E and $E^1$ consider the following:

If a neutron, with velocity $v_1$ and mass 1, approaches a nucleus whose velocity is zero and mass is M, the C. G. system is moving with velocity $(1/M+1)v_1$ in the laboratory system. The velocities in the C. G. system then are represented as shown in Fig. 2. The velocity in the C. G. system of each particle in an elastic scattering collision changes in direction but not in magnitude.

Figure 3:
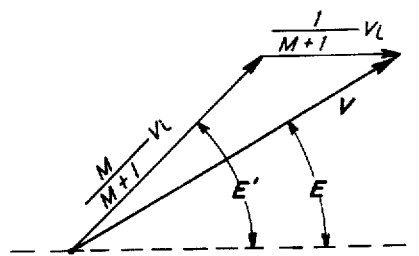
Fig. 3 is a diagram illustrating scattered neutron velocity as a vector sum.

To obtain the velocity, $v$, or the direction, E, of the scattered neutron in the laboratory system, the neutron velocity in the C. G. system must be added vectorially to the velocity of the C. G. system in the laboratory system as shown in Fig. 3. From this vector diagram it is seen that $$\cos E = \frac{M\cos E^1 + 1}{\sqrt{M^2+1+2M\cos E^1}} \quad (3)$$

Therefore the correction factor to be applied to $A_d/\pi\gamma sd^2$ is $$\frac{1-\cos E^1}{1-\cos E} = \frac{1-\cos E^1}{1-\dfrac{M\cos E^1+1}{\sqrt{M^2+1+2M\cos E^1}}} \quad (4)$$

In the assumed geometry $E = 0.05$ radians, and the corrections calculated with Equations 3 and 4 are:

4.0 for $M=1$ (hydrogen nucleus)
1.2 for $M=12$ (carbon nucleus)

Therefore in place of $A_d/4\pi\gamma sd^2$ the correct term is $$\frac{A_d}{4\pi\gamma sd^2}$$

($4.0 \times$ the fraction scattered by H $+ 1.2 \times$ the fraction scattered by C) or $$\frac{A_d}{4\pi\gamma sd^2} \cdot \frac{4.0 n_H s_H + 1.2 n_C s_C}{n_H s_H + n_C s_C}$$

and Equation 2A is replaced by $$T = T^1 + (1-T^1)\frac{A_s}{\pi\gamma^2}\cdot\frac{4.0 n_H s_H + 1.2 n_C s_C}{n_H s_H + n_C s_C} \quad (5)$$

for neutron energies $\geq 1$ ev. and remains unmodified for neutron energies $<1$ ev.

Now putting in the values from the assumed geometry, Fig. 1, viz:

$As = \pi$ cm.$^2$
$\gamma = 10$ cm.
$X = 1$ cm.

$$T = e^{-(n_H s_H + n_C s_C)} + \frac{0.040 n_H s_H + 0.012 n_C s_C}{n_H s_H + n_C s_C}\left[1 - e^{-(n_H s_H + n_C s_C)}\right] \quad (6)$$

for neutron energies $\geq 1$ ev. and $$T = 0.010 + 0.990 e^{-(n_H s_H + n_C s_C)} \quad (6A)$$

for neutron energies $<1$ ev. where T is the fractional transmission to neutrons of a certain energy $$\left(=\frac{\text{no. neutrons of that energy arriving at D,}}{\text{no. neutrons of that energy arriving at D}}\text{Fig. 1 with S in the beam}\right)$$

$n_H$ is the number of H atoms per cm.$^3$ in S
$n_C$ is the number of C atoms per cm.$^3$ in S
$s_H$ is the cm.$^2$ cross section of H for neutrons of the energy considered
$s_C$ is the cm.$^2$ cross section of C for neutrons of the energy considered NOTE.—Equation 6A is not entirely accurate, especially at the lower (thermal) energies of its range. A number of effects take place which tend to mask the simple effects considered above. These low energy effects include: multiple scattering, more likely at the high cross sections; chemical bond effect; molecular motion effect; neutron capture by impurities; non-isotropic scattering.

III. EQUATIONS FOR CALCULATING

Equations 6 and 6A are the correct equations to use for calculating the fractional transmission to neutrons of any energy for any hydrocarbon or mixture in geometry described in Fig. 1. Calculation of a number of hydrocarbons shows that the terms in both numerator and denominator of the fractional coefficient of Equation 6 may be dropped with negligible loss of accuracy, and therefore a good approximate equation is $$T = 0.040 + 0.960 e^{-(n_H s_H + n_C s_C)} \quad (7)$$

Now $$n_H = A d \frac{n_{Hm}}{M}$$

and $$n_C = A d \frac{n_{Cm}}{M}$$

where $A$ is Avogadro's number, $0.603 \times 10^{24}$ molecules/mole; $d$ is density of the hydrocarbon sample in gm./cm.$^3$; $n_{Hm}$ and $n_{Cm}$ are the number of H-atoms and the number of C-atoms per molecule.

$M$ is the molecule weight of the hydrocarbon sample in gm./mole.

If $R = n_{Hm}/n_{Cm}$, and $$A \frac{n_{Cm}}{M}$$

(which is practically a constant for all heavy hydrocarbons) $M \equiv k$, the equation 7 becomes $$T = 0.040 + 0.960 e^{-kd(R s_H + s_C)} \quad (8)$$

for neutrons of energies $\geq 1$ ev. and $$T = 0.010 + 0.990 e^{-kd(R s_H + s_C)} \quad (8A)$$

for neutrons of energies $< 1$ ev.

An expression for the change in transmission as a function of change in composition of the sample is desirable. Since $s_H$ and $s_C$ are constant and $k$ is practically constant over a variation in composition, an expression for the change of $T$ with a change of $R$ and $d$ can be obtained by differentiating Equation 8. Since in Equation 8 the $s_C$ term is small compared to the $R s_H$ term in the exponent, little error is introduced by holding the density constant at some value $d_1$ in this term during the differentiation.

$$\frac{\delta T}{\delta (Rd)} = 0.960 \frac{\delta}{\delta (Rd)} e^{-(k s_H Rd + k s_C d_1)}$$

$$= -0.960 k s_H e^{-kd(R s_H + s_C)}$$

and $$\frac{\Delta T}{T} = -k s_H \Delta (Rd) \frac{0.960}{0.040 e^{+kd(R s_H + s_C)} + 0.960}$$

or $$\frac{\Delta T}{T} = -k s_H \Delta (Rd) \left[ 1 - 0.042 e^{+kd(R s_H + s_C)} \right]$$

which, upon numerical evaluation in the range of energies for which Equation 8 is valid, is found to be well approximated by $$\frac{\Delta T}{T} = -k s_H \Delta (Rd) \quad (9)$$

for neutron energies $\geq 1$ ev.

Similarly, starting with Equation 8A it can be shown that $$\frac{\Delta T}{T} = -k s_H \Delta (Rd) \left[ 1 - 0.010 e^{+kd(R s_H + s_C)} \right] A(9)$$

for neutron energies $< 1$ ev.

To calculate $\Delta (Rd)$ for any proposed change in composition of a hydrocarbon sample the $R$ and the $d$ may be calculated for the two cases by the exact formulas:

$$\left. \begin{array}{l} R = \dfrac{\epsilon_i n_{Hmi} X_i}{\epsilon_i n_{Cmi} X_i} \\ d = \epsilon_i d_i X_i \end{array} \right\} \quad (10)$$

and where $n_{Hmi}$ and $n_{Cmi}$ are the numbers of H and C atoms per molecule of type $i$ and $X_i$ and $d_i$ are the mole fraction and density of compound of type $i$.

However for binary mixtures a good approximation is $$\Delta (Rd) = -\Delta X (R_1 d_1 - R_2 d_2) \quad (11)$$

where $R_1$ and $R_2$ are the H to C ratios in pure compounds 1 and 2, and $d_1$ and $d_2$ are the densities of pure compounds 1 and 2.

IV. Sample Calculations

To summarize the working equations, which apply only to the geometry shown in Fig. 1; the exact transmission equations are:

$$T = e^{-(n_H s_H + n_C s_C)} + \frac{0.040 n_H s_H + 0.0.2 n_C s_C}{n_H s_H + n_C s_C} \left[ 1 - e^{-(n_H s_H + n_C s_C)} \right] \quad (6)$$

for neutron energies $\geq 1$ ev.

$$T = 0.010 + 0.990 e^{-(n_H s_H + n_C s_C)} \quad (6A)$$

for neutron energies $< 1$ ev.

Approximate transmission equations:

$$T = 0.040 + 0.960 e^{-A \frac{n_{Cm}}{M} d (R s_H + s_C)} \quad (8)$$

for neutron energies $\geq 1$ ev.

$$T = 0.010 + 0.990 e^{-A \frac{n_{Cm}}{M} d (R s_H + s_C)} \quad (8A)$$

for neutron energies $< 1$ ev.

Fractional change in transmission:

$$\Delta T / T = -A \frac{n_{Cm}}{M} s_H \Delta (Rd) \quad (9)$$

for neutron energies $\geq 1$ ev.

$$\Delta T / T = -A \frac{n_{Cm}}{M} s_H \Delta (Rd) \left[ 1 - 9.010 e + A \frac{n_{Cm}}{M} d (R s_H + s_C) \right] \quad (9A)$$

for neutron energies $< 1$ ev. where, to calculate $(Rd)$, the terms employed are $$\left. \begin{array}{l} R = \dfrac{\epsilon_i n_{Hmi} X_i}{\epsilon_i n_{Cmi} X_i} \\ d = \epsilon_i d_i X_i \end{array} \right\} \quad (10)$$

or the approximation which is suitable for small changes in binary mixtures, $$\Delta (Rd) = -\Delta X (R_1 d_1 - R_2 d_2) \quad (11)$$

Glossary $A = 0.603 \times 10^{24}$ molecules/mole.
$n_{Cm}$ = no. C-atoms per molecule (or effective no. per molecule if a mixture).
$M$ = molecular weight of sample (or effective molecular weight if a mixture) gm./mole.
$d$ = density of sample (or effective density if a mixture) gm./cm.$^3$.
$d_i$ = density of compound of type $i$.
$R$ = ratio of H-atoms to C-atoms in sample.
$s_H$ and $s_C$ = cross sections of H- and C-atoms for neutrons of energy being considered.
$n_H$ and $n_C$ = no. of H- and C-atoms per cm.$^3$.
$n_{Hmi}$ and $n_{Cmi}$ = no. H- and C-atoms per molecule of type $i$.
$X_i$ = mole fraction of compound of type $i$.

For sample calculations the following hydrocarbons will be used:

|  | n-Butane, $C_4H_{10}$ | Isobutylene, $C_4H_8$ | 2-Butyne, $C_4H_6$ |
|---|---|---|---|
| $n_H=$ | 10 | 8 | 6 |
| $n_{Cm}=$ | 4 | 4 | 4 |
| $d=$ | 0.60 | 0.67 | 0.69 |
| $M=$ | 58.5 | 56. | 54. |
| $R=$ | 2.5 | 2.0 | 1.5 |

The graph (Fig. 4) shows a plot of T for each of these hydrocarbons over a range of $10^{-2}$ to $10^7$ ev. of neutron energies. Values for cross sections used are the "total cross sections" for H and C published by Goldsmith, Ibser, and Feld in both Rev. Mod. Phys. 19, 259 (1947) and The Science and Engineering of Nuclear Power (MIT Seminar Notes), p. 393, vol. 1, edited by C. Goodman, Addison-Wesley Press, Cambridge, Mass. (1947). This graph is not intended to be accurate throughout, but rather to indicate roughly the amount of transmission to be expected at the various energies. Each curve is simply a series of straight lines connecting the points calculated at energies $10^{-2}$, $10^{-1}$, 1, 10, $10^4$, $10^5$, $10^6$, and $10^7$ ev. The calculations were made using the exact Equations 6 and 6A.

The satisfactory character of the approximation in Equation 8 is shown by the comparison table A which follows: Equation 6A and 8A are identical.

TABLE

| Neutron Energy, ev | $s_H \times 10^{-24} cm.^2$ | $s_C \times 10^{-24} cm.^2$ | n-Butane | | Isobutylene | | 2-Butyne | |
|---|---|---|---|---|---|---|---|---|
| | | | Exact, Eq. (6) | Approx., Eq. (8) | Exact, Eq. (6) | Approx., Eq. (8) | Exact, Eq. (6) | Approx., Eq. (8) |
| $10^{-2}$ | 71 | 3.8 | 0.020 | | 0.025 | | 0.044 | |
| $10^{-1}$ | 36 | 4.7 | 0.101 | | 0.119 | | 0.172 | |
| 1 | 22 | 4.5 | 0.254 | 0.256 | 0.275 | 0.277 | 0.342 | 0.344 |
| 10 | 21 | 4.4 | 0.268 | 0.270 | 0.289 | 0.292 | 0.354 | 0.357 |
| $10^4$ | 19.5 | 4.8 | 0.289 | 0.292 | 0.310 | 0.313 | 0.373 | 0.376 |
| $10^5$ | 13 | 4.5 | 0.417 | 0.419 | 0.436 | 0.433 | 0.495 | 0.498 |
| $10^6$ | 4.5 | 2.4 | 0.722 | 0.724 | 0.729 | 0.731 | 0.764 | 0.766 |
| $10^7$ | 0.8 | 1. | 0.934 | 0.935 | 0.925 | 0.926 | 0.934 | 0.935 |

SAMPLE CALCULATION 1

Problem

A mixture of n-butane and isobutylene changes its n-butane concentration from 20% to 40%. What is the percent change in neutron transmission at (a) $10^{-1}$ ev.?
(b) 1 ev?
(c) $10^6$ ev?

For a measure of error caused by using wrong equation, calculate each case by both Eq. 9 and Eq. 9A.

Outline

First calculate $\Delta(Rd)$ from Eq. 11. Then calculate $\Delta T/T$ from Eq. 9, also from Eq. 9A.

Data $\Delta X = .20$
$R_1 = 2.5$
$R_2 = 2.0$
$d_1 = 0.60$
$d_2 = 0.67$
$A = 0.603 \times 10^{24}$
$M = 57.6$
$n_{Cm} = 4$
$s_H = 36 \times 10^{-24}$ for case (a); $22 \times 10^{-24}$ for case (b); $4.5 \times 10^{-24}$ for case (c)
$s_C = 4.7 \times 10^{-24}$ for case (a); $4.5 \times 10^{-24}$ for case (b); $2.4 \times 10^{-24}$ for case (c)
$d = 0.614$
$R = 2.4$

Calculation (a)

$\Delta(Rd) = -\Delta X(R_1 d_1 - R_2 d_2) = -0.032$ by Eq. 11

$\Delta T/T = -A\frac{n_{Cm}}{M}s_H \Delta(Rd)\left[1 - 0.01e^{+A\frac{n_{Cm}}{M}d(Rs_H + s_C)}\right] = 4.3\%$ by Eq. 9A $\Delta T/T = -A\frac{n_{Cm}}{M}s_H \Delta(Rd) = 4.8\%$ by Eq. (9), not valid for this low energy.

Calculation (b)

$\Delta T/T = 2.8\%$ by Equation 9A
$\Delta T/T = 3.0\%$ by Equation 9

Calculation (c)

$\Delta T/T = 0.6\%$ by Equation 9A
$\Delta T/T = 0.6\%$ by Equation 9

SAMPLE CALCULATION 2

Problem

A mixture of n-butane and 2-butyne changes its n-butane concentration from 60% to 70%. What is the percent change in neutron transmission at $10^4$ ev.?

Outline

First calculate $\Delta(Rd)$ from Eq. 11. Then calculate $\Delta T/T$ from Eq. 9.

Data $\Delta X = .10$
$R_1 = 2.5$
$R_2 = 1.5$
$d_1 = 0.60$
$d_2 = 0.69$
$A = 0.603 \times 10^{24}$
$n_{Cm} = 4$
$M = 55$
$s_H = 19.5$

Calculation $\Delta(Rd) = -\Delta X(R_1 d_1 - R_2 d_2) = -.047$ by Eq. (11)

$\Delta T/T = -A\frac{n_{Cm}}{M}s_H \Delta(Rd) = 4.0\%$ by Eq. (9)

SAMPLE CALCULATION 3

Problem

A ternary mixture of n-butane, isobutylene, and 2-butyne in the proportions 60-30-10 changes to the proportions 50-20-30. What is the percent change in neutron transmission at $10^6$ ev.?

Outline

First calculate $\Delta(Rd)$ from Eq. 10. Then calculate $\Delta T/T$ from Eq. 9.

Data $n_{Hm1} = 10$
$n_{Hm2} = 8$
$n_{Hm3} = 6$
$A = 0.603 \times 10^{24}$
$n_{Cm} = 4.0$
$M = 57$.
$s_H = 4.5$
$n_{Cm1} = 4$
$n_{Cm2} = 4$
$n_{Cm3} = 4$
$(X_1)_I = 0.6$
$(X_2)_I = 0.3$
$(X_3)_I = 0.1$
$(X_1)_{II} = 0.5$
$(X_2)_{II} = 0.2$
$(X_3)_{II} = 0.3$
$d_1 = 0.60$
$d_2 = 0.67$
$d_3 = 0.69$

Calculation $$R_I = \frac{n_{Hm1}(X_1)_I + n_{Hm2}(X_2)_I + n_{Hm3}(X_3)_I}{n_{Cm1}(X_1)_I + n_{Cm2}(X_2)_I + n_{Cm3}(X_3)_I} = 2.25$$

$$R_{II} = \frac{n_{Hm1}(X_1)_{II} + n_{Hm2}(X_2)_{II} + n_{Hm3}(X_3)_{II}}{n_{Cm1}(X_1)_{II} + n_{Cm2}(X_2)_{II} + n_{Cm3}(X_3)_{II}} = 2.10 \text{ by Eq. 10}$$

$$d_I = d_1(X_1)_I + d_2(X_2)_I + d_3(X_3)_I = 0.63$$

$$d_{II} = d_1(X_1)_{II} + d_2(X_2)_{II} + d_3(X_3)_{II} = 0.64$$

$$\Delta(Rd) = R_{II}d_{II} - R_I d_I = -0.08$$

$$\Delta T/T = -A \frac{n_{Cm}}{M} s_H \Delta(Rd) = 1.5\% \text{ by Eq. 9}$$

It has been demonstrated that (1) A change in composition of a mixture of n-butane and isobutylene from 20-80 proportions to 40-60 proportions is accompanied by a percentage change in neutron transmission of 4%, 3% and 0.6% at neutron energies respectively of $10^{-1}$ ev., 1 ev., and $10^6$ ev.;

(2) A change in composition of a mixture of n-butane and 2-butyne from 60-40 proportions to 70-30 proportions is accompanied by a change in neutron transmission of 4% to $10^4$ ev.;

(3) A mixture of n-butane, isobutylene and 2-butyne which changes from 60-30-10 proportions to 50-20-30 proportions will cause a change in neutron transmission of 1.5% at $10^6$ ev.

Such examples may be multiplied indefinitely, employing the generalized equations which have been developed. The three sample calculations do not, by any means, express maximum changes in neutron transmission, for with mixtures of hydrocarbons having greatly different hydrogen contents, the change in transmission with change in proportion of constituents will be even more marked.

It has been observed that the maximum percent changes in neutron transmission occur at low neutron energies, although the maximum absolute changes are in the range of 1 ev. to $10^4$ ev. Even bearing in mind that the calculations for energies below 1 ev. cannot be considered as extremely accurate, it is apparent that in the practice of the invention, increased discrimination between compounds in a mixture is to be obtained with neutron energies of not to exceed $10^4$ ev.

The calibration of apparatus employed in the invention is simple. The neutron source, the vessel for the samples, and the detector are disposed in a desired fixed geometrical relationship, say that illustrated in Fig. 1, and intensity readings are taken while the vessel is filled with each of a series of samples. In calibrating for a given binary mixture, for example, intensity readings are taken for the individual components and for mixtures containing various proportions of the two components. Intensities are then plotted against proportions to produce a curve which shows at a glance the intensity representative of particular proportions in the mixture.

The invention may be employed to compare succeeding portions of a stream, as already described, or it may be employed to compare batches, say binary mixtures containing the same components but in different proportions. In either case intensity readings are obtained for succeeding portions or different batches, preferably employing the same geometrical relationship of source, sample and detector in each case.

Although the invention has been described with reference to a particular geometric arrangement, it should be understood that measurement of the intensity of scattered, as distinguished from transmitted neutrons, also permits determination of change in composition. This is illustrated in Fig. 5, wherein the detector is placed at an angle with respect to the beam of neutrons. The practice with the apparatus of Fig. 5 is the same as with the apparatus of Fig. 1. Neutron intensity, in terms of counts per unit time, is observed continuously at the detector, and is an index of changing composition in the hydrocarbon stream which acts to scatter the neutrons and reduce their energy.

The process of the invention is applicable to the analysis of solid, gaseous, and liquid mixtures, but finds its greatest application in continuous analysis of liquid and gaseous streams in oil refineries and the like. All that is required for the practice of the invention is a neutron source, a sample in a vassel or conduit, a neutron detector, and conventional amplification and recording equipment employed with such detectors. Any geometric arrangement may be employed which permits neutrons from the source to penetrate the sample and be transmitted or scattered to the detector, a fixed geometry being preferable because of the simplicity it lends to comparative analysis.

I claim:

1. In the analysis of a mixture of carbon-hydrogen compounds, the improvement which comprises bombarding a fixed fluid cross section of the mixture with neutrons having an energy not to exceed $10^4$ ev., determining the intensity of neutrons emerging from the mixture and comparing this intensity with a neutron intensity determined by bombarding a fixed fluid cross section of known composition and containing a carbon-hydrogen compound with neutrons having an energy not to exceed $10^4$ ev. and determining the intensity of neutrons emerging from this second cross section.

2. In the analysis of a mixture of carbon-hydrogen compounds, the improvement which comprises bombarding a fixed fluid cross section of the mixture with neutrons having energies in the range of about 1 to about $10^4$ ev., determining the intensity of neutrons emitted from the mixture and comparing this intensity with a neutron intensity determined by bombarding a second fixed fluid cross section of known composition and containing a carbon-hydrogen compound with neutrons having energies in said range and determining the intensity of neutrons emitted from the second cross section.

KENNETH C. CRUMRINE.

REFERENCES CITED

The following references are of record in the file of this patent:

UNITED STATES PATENTS

| Number | Name | Date |
|---|---|---|
| 2,220,509 | Brons | Nov. 5, 1940 |
| 2,304,910 | Hare | Dec. 15, 1942 |
| 2,316,329 | Hare | Apr. 13, 1943 |
| 2,437,935 | Brunner | Mar. 16, 1948 |
| 2,462,270 | Lipson | Feb. 22, 1949 |
| 2,487,797 | Friedman et al. | Nov. 15, 1949 |

Certificate of Correction

Patent No. 2,567,057                                                  September 4, 1951

KENNETH C. CRUMRINE

It is hereby certified that error appears in the printed specification of the above numbered patent requiring correction as follows:

Column 4, line 57, Equation (1A), strike out "Q" and insert therefor a closing parenthesis; column 5, line 13, strike out "$\gamma s d^2$", second occurrence; column 6, line 7, before "$\pi$" insert $4$; column 7, line 25, for "$M \equiv k$" read $= k$; line 65, for "A(9)" read ($9A$); column 8, line 45, for that portion of the equation reading "$1 - 9.010e +$" read $1 - 0.010e +$; line 54, for "$d$", second occurrence, read $d_1$; column 11, line 25, in the denominator in the first equation, for "$n_{Cmi}$" read $n_{Cmr}$;

and that the said Letters Patent should be read as corrected above, so that the same may conform to the record of the case in the Patent Office.

Signed and sealed this 29th day of January, A. D. 1952.

[SEAL]

THOMAS F. MURPHY,
*Assistant Commissioner of Patents.*